UNITED STATES PATENT OFFICE.

ANDREW THOMA, OF CAMBRIDGE, MASSACHUSETTS, ASSIGNOR TO THOMA CORPORATION, OF PORTLAND, MAINE, A CORPORATION OF MAINE.

CEMENT PACKAGE.

No. 862,360.　　　Specification of Letters Patent.　　　Patented Aug. 6, 1907.

Application filed October 2, 1905. Serial No. 280,957.

*To all whom it may concern:*

Be it known that I, ANDREW THOMA, a citizen of the United States, and a resident of Cambridge, in the county of Middlesex and Commonwealth of Massachusetts, have invented an Improvement in Cement Packages, of which the following description is a specification.

My invention relates to a package, whereby a semi-solid cement or jelly-like compound may be easily, quickly and cheaply handled in non-adhesive segregated parcels, separable as such from the cans or other inclosures. To this end I have succeeded in producing means whereby even the most permanently sticky cement can be done up in self-sustaining packages, and safely kept ready to the operator's hand.

My invention, although applicable to all kinds of semi-solid cement of jelly-like consistency, is of particular advantage in connection with the manufacture of shoes.

By reason of the packaging of the cement in the manner hereinafter explained, the cement may be kept ready at hand without deteriorating and without fire risk or danger of smearing the shoes, machines or operators, so that thereby the work is greatly facilitated and considerable economy of labor and cement results.

In making shoes it is desirable to use rubber or gutta-percha cements, but on account of the volatile and inflammable nature of the naphtha-solvents in these cements, it is customary either to deliver fresh cement each morning or to keep the cement in an outbuilding away from the main factory, where it often rapidly wastes and deteriorates and in time of frost the rubber is deadened or its sticking quality injured by the cold; and in use, is slow to dry (especially in humid weather), expensive, wasteful, will not stick wet leather, and because of its stringy character it cannot be used neatly. Accordingly my present invention forms a part of my general invention, which includes the cement, whereby I retain the advantages or characteristics of the gutta-percha above mentioned, and yet make possible the practical use in regular shoe factory work of a cement having no solvent or other volatile and non-cementitious elements.

By reason of my present invention, the cement package can be prepared in exactly the right condition for the workmens use, and yet the package is self-sustaining, so that it may be kept exposed in quantity in the factory ready for either future or instant use, being maintained in its pliable and practically changeless sticky condition without suffering any loss in quality or quantity through evaporation.

I prepare small tubes or boxes of tarred or oiled paper, having the inside surface coated with a thin layer of any suitable normally pulverulent substance or plaster such as plaster of paris or earthy matter like talc or whiting, or with lime and the talc or whiting, forming when dry a hard film or lining on the tarred or oiled paper. These prepared tubes are then filled with hot cement which adheres to the lining and when cooled and hard causes the lining to break away from the tarred or oiled paper, thereby allowing the removal of the cement and its adherent plaster from the box in a self-sustaining package protected externally with the outside coating of whiting, etc. The melted cement is poured into the hollow plaster jacket and the sustaining or supporting box or tube in which it remains until the cement has set. As it sets it shrinks slightly and tends to pull the enveloping frangible jacket away from the supporting box of tarred or oiled paper, so that the package of cement and its supporting wall of plaster become practically loose from the box, so that they may be dumped out from the box without difficulty. The result is that the removed package, although consisting of materials which taken separately would not be self-sustaining for useful purposes, are together firm and capable of being packed and handled. I do not mean to imply that the package will endure much weight, but it is sufficiently self-sustaining for purposes of transportation, so that the packages may be carried about the factory and may be placed convenient to the hand of the operator without any danger of the cement breaking down, or the package flattening out or causing inconvenience. The cement is about like a soft cheese, tending to sag or bulge slightly *en masse*. If the operator wishes to use half a package only, he simply takes his knife and cuts the package in two, the enveloping frangible jacket offering no material obstacle. Either a portion of the package or the whole of the package and its enveloping covering are thrown into the cement pot and melted, whereupon the thin external coating breaks down in the cement without inconvenience or damage. Instead of the whiting film, I may employ a shell of light tissue paper for receiving the hot liquid cement, and for permitting the removal thereof from the box when the cement is set. This permits the removal of the cement but does not have the advantages of the frangible shell previously explained.

The advantages of my invention are particularly apparent in connection with sticky cement. Such cement when poured into a can or bottle can never be entirely removed, and the removal of even a small portion thereof from the can or bottle is laborious and extremely wasteful, as the cement smears all over the inside of the receptacle, and, being nearly solid, will not run but has to be poked down and otherwise urged, so that it has never been attempted to use such cement in a shoe factory. Also if cement of the character mentioned were left *en masse* without any protecting can or bottle, it would catch against all objects which might come in contact therewith, and would quickly become fouled with scraps of leather, thread, shoe linings, and refuse matter, so that it would be unfit for use and would be a constant menace and nuisance in the factory. It will be seen therefore that my invention not only obviates the inconvenience, waste and delay which would be caused by attempting to use this kind of cement in cans or bottles, but at the same time it is neat and makes possible the presence of sticky cement *en masse* in the shoe room without any possibility of harm resulting from the presence of such a sticky body. Besides the foregoing advantages, it is extremely economical, because not only is all the cement used, but the large cost of expensive packaging which has hitherto been considered necessary is entirely done away with. The strongly adhesive, viscid mass may be readily handled in its coating of plaster or tissue and can be cut into pieces to be reheated before using. The cement and its coating, which are stuck non-detachably together, are thrown into the steam jacketed pot or kettle and as the cement melts the coating breaks down and withdraws itself automatically from interference with the cement; and in the case of the frangible coating or jacket, its pulverulent composition permits it to disintegrate and disappear.

Having described my invention, what I claim as new and desire to secure by Letters Patent, is:

1. The herein described cement package, consisting of a normally sticky, plastic, jelly-like body of cement and an external non-sticky coating adherent thereto, the cement and coating forming a self-sustaining package when cold but neither being self-sustaining alone, and the coating consisting of a material capable of being broken down by the melting of the cement and of automatically withdrawing from interference with the cement when the latter is heated for use, without becoming incorporated into the cement compound.

2. The herein described cement package, consisting of a normally sticky, jelly-like body of cement and an external non-sticky coating adherent thereto, the cement and coating forming a self-sustaining package when cold, the coating consisting of normally pulverulent material readily frangible into a powder-like form when the sustaining presence of the inclosed cement body is withdrawn by the melting of the cement for use.

3. The herein described cement package, consisting of a normally sticky cement body and an adherent external readily frangible coating of plaster.

In testimony whereof, I have signed my name to this specification, in the presence of two subscribing witnesses.

ANDREW THOMA.

Witnesses:
GEO. H. MAXWELL,
M. A. JONES.